United States Patent [19]

Hargrave et al.

[11] Patent Number: 4,575,840

[45] Date of Patent: Mar. 11, 1986

[54] TELEPHONE LINE ACCESS DEVICE FOR MAIN DISTRIBUTION FRAME

[75] Inventors: Franklin Hargrave, Newtown; Edward J. Linke, Jr., Monroe; Francisco A. Middleton, Sandy Hook, all of Conn.

[73] Assignee: ITT Corporation, New York, N.Y.

[21] Appl. No.: 595,120

[22] Filed: Mar. 30, 1984

[51] Int. Cl.⁴ .......................... H04J 3/14; H04M 3/22
[52] U.S. Cl. ....................................... 370/13; 179/98; 179/175.2 R; 361/428
[58] Field of Search ...................... 370/58, 13; 179/98, 179/175.3 R, 175.2 R, 175.2 C, 175; 361/426, 428

[56] References Cited

U.S. PATENT DOCUMENTS

| | | | |
|---|---|---|---|
| 3,936,133 | 2/1976 | Splitt et al. | 361/428 |
| 4,035,587 | 7/1977 | Undhjem et al. | 179/98 |
| 4,131,934 | 12/1978 | Becker et al. | 361/428 |
| 4,176,257 | 11/1979 | DeLuca | 361/428 |
| 4,272,141 | 6/1981 | McKeen et al. | 361/428 |
| 4,273,966 | 6/1981 | Briggs et al. | 179/98 |
| 4,288,838 | 9/1981 | Van Der Vegte et al. | 361/428 |
| 4,331,839 | 5/1982 | Baumbach | 361/426 |

FOREIGN PATENT DOCUMENTS 2321794  3/1977  France ................... 179/98

Primary Examiner—Douglas W. Olms
Attorney, Agent, or Firm—Peter C. Van Der Sluys

[57] ABSTRACT

An access device is provided for a main distribution frame of a telephone system. The access device, which may be structured as a set of access blocks, is positioned between surge protection modules and their corresponding vertical input terminal block so as to make electrical contact with the subscriber telephone line without interruption of the array of harnesses which couple together the various terminal blocks of the main distribution frame. A printed circuit contained within each of the access blocks comprises conductors which contact feed-through terminals of the access block, the conductor coupling these terminals to multiplexers which provide for the selective coupling of messages from the subscriber lines to the subscriber line of a message receiving station.

15 Claims, 8 Drawing Figures

TO SUBSCRIBERS
OUTSIDE PLANT

TELEPHONE LINE ACCESS DEVICE FOR MAIN DISTRIBUTION FRAME

BACKGROUND OF THE INVENTION

This invention relates to the main distribution frame used in telephone systems and, more particularly, to an electric circuit and adapter for connection with individual pairs of telephone lines at the sites of their respective lightning or surge protectors.

Telephone systems throughout the United States and in other countries provide for the interconnection of the telephone lines of the subscribers at a wiring support structure known as a main distribution frame (MDF). Such frames support blocks of wire contacts oriented in a vertical attitude and in a horizontal attitude. The terminal blocks having the vertical attitude connect with the pairs of wires (Tip and Ring) which, in turn, connect with the homes and businesses of the subscribers. The horizontal terminal blocks connect with wires which are coupled to the switching equipment by which the subscribers are connected to each other. Connections of pairs of wires are made between the vertical blocks and the horizontal blocks, called cross-connects, to connect outside subscribers to the telephone switching equipment.

Some of the vertical terminal blocks have been in use for many decades. While the form of these blocks has varied somewhat over the years, the general form has been substantially retained. As an exemplary form of vertical terminal block, the block contains groups of sockets, the groups being arranged in rows and columns. For example, there may be five groups in a row and twenty groups in a column. This provides a set of one hundred groups of sockets.

In each group of sockets, two sockets connect with the tip and ring wires going to a subscriber, another two sockets connect with the ring and tip wires coupled to the horizontal terminal block, and a fifth socket connects with ground. Each group of five sockets receives a lightning or surge protector module which is constructed in any one of a number of conventional designs and has five prongs which are inserted into the five sockets.

There is one characteristic of a main distribution frame and the terminal blocks thereon which is of importance in understanding the significance of the invention. This characteristic is the relatively dense packing of the terminal blocks and the wires coupled thereto.

The wires are arranged in harnesses which fill a major portion of the available volume of the main distribution frame. The vertical terminal blocks are arranged in rows and columns, a typical installation having ten vertical terminal blocks arranged in a column, with successive ones of the columns being arranged in side-by-side format. There is relatively little space between the blocks in any one column, and relatively little space between the successive columns by which access may be had to the wire harnesses connected thereto.

There is also a second characteristic of a main distribution frame which is of significance in appreciating the invention. This is the fragility of the electric wires in the harnesses. Since some of these harnesses have been in place for many decades, the wire insulation may have become sufficiently brittle so as to introduce a significant chance of fracture in the event that they be manipulated. For example, connection of equipment to the wires for access to electric signals carried thereon might require the cutting and bending of the wires to make connection with such external equipment. The resulting manipulation may fracture the insulation or the wires themselves so as to require a rewiring of the main distribution frame. Clearly, such a task would be most undesirable, both in terms of lost time and in terms of expense not to mention interruption of service for a prolonged period of time.

There are many instances where it would be desirable to gain access to the subscriber lines at the main distribution frame. Because of the above-mentioned reasons such access heretofore has been impossible or impractical.

Access to subscriber lines would be useful for test purposes and line monitoring.

It is noted that modern homes and business establishments are provided with one or more telephone lines. In addition, it is noted that such homes and business establishments may also be provided with a variety of services which are to be monitored. These may include, for example, water, fuel, electric as well as more recent services such as cable television and alarm services. It has long been the well known practice to have a meter-reader person periodically visit homes and business establishments for the reading of water meters, electric meters and gas meters.

Telephone lines are used for communication of a large variety of messages, and could be utilized also for the transmission of data relating to the reading of such meters. Indeed, encoders exist for the translation of measured data to a form of electronic signal which can be transmitted via telemetry links, telephone lines, and other forms of communication systems.

Telephone lines are currently in use for the transmission of information from subscriber to subscriber, such information including computer generated signals, video signals of scanned documents, as well as voice signals. Modems are frequently employed for converting digital data signals to a form suitable for transmission over telephone lines, and for converting such transmitted signals back to the digital signal format. In particular, it is noted that all such communication is done on a basis of subscriber to subscriber.

A problem is found when it is desired to transmit information from many subscribers to one recipient of such information. For example, it may be desirable to transmit information from the water meters located at the sites of various subscribers to the water company for automatic monitoring of the usages of water distribution. However, it is noted that, at the present time, such information can only be transmitted via the telephone lines by successively calling up each subscriber to initiate a communication between the subscriber and the water company. Even if a modem and suitable encoding device were connected between the water meter and the telephone line, such communication could only be accomplished by the calling up of the subscriber by the water company, or by a telephone call being initiated by the subscriber to the telephone company or by equipment at the subscriber premise.

Ideally, the requisite communication between a large number of subscribers and a single subscriber, such as the water company, could be accomplished if the central office equipment were able to support two (or more) paths through the switch simultaneously. An alternate method of providing the service is possible if it were possible to install some form of signal multiplexing equipment directly at the central office of the telephone company. Such equipment could be connected anywhere in the central office between the cable entrance point and the input to the switching equipment normally used for routing telephone conversation traffic. Each point in this path has a problem such as: (1) connection to any point between the horizontal part of the main distribution frame and the central office switch would require the coordination of external line equipment and the equipment at the switch, and because not all links between the vertical and horizontal connector blocks may be installed, not all external lines would be available; (2) connection before the vertical connector block is not practical because it requires tapping into a cable; therefore, the access point for such equipment would be at the main distribution frame to the area subscribers.

However, a problem exists in that such connection of multiplexing equipment to the subscriber telephone lines at the main distribution frame is contraindicated due to the brittleness of the wires and the lack of space between the harnesses and between the connector blocks. The problem is complicated by the fact that any connection of such equipment must be accomplished without an interruption of telephone service for any more than a relatively insignificant amount of time. Maintenance of any interconnection equipment, such as multiplexing equipment should also not create interruption of telephone service.

SUMMARY OF THE INVENTION

The aforementioned problem is overcome and other advantages are provided by a system incorporating the invention to provide access to subscriber telephone lines at a main distribution frame so as to permit miltiplexing of the signals of a multiplicity of such subscriber lines to a single subscriber line.

In accordance with a major feature of the invention, access to the subscriber telephone lines is attained by use of the connections presently employed between the lightning or surge protector modules and each of the telephone lines. This is accomplished by inserting a set of access blocks between a vertical block and the lightning protector modules. For example, in the case wherein the vertical block comprises twenty rows of five sets of sockets for connection with a corresponding array of lightning or surge protector modules, ten access blocks may be employed. In this example each access block would provide a coupling for two rows of the lightning protectors. Other combinations of rows and sets could be used such as 1×5, 4×5, etc.

Each access block includes sockets and pins which provide electrical connection between the lightning protector modules and the vertical block. In addition, each block includes further wiring for tapping signals between the telephone lines and multiplexing equipment.

The thickness of an access block is sufficiently small so as to require no more than a slight displacement of the lightning protector modules from their original position. In this way, access is had to old subscriber telephone lines within the limited confines of the main distribution frame. Such access is made without the necessity for the cutting or manipulation of any of the existing telephone lines in the numerous harnesses of the main distribution frame.

One or more integrated circuit (IC) modules comprising multiplexing circuits are attached to each access block. In a preferred embodiment of the invention, two such modules are connected to an access block with each module providing for the multiplexing of the signals of the five telephone lines in one row of the protector modules. Groups of these multiplexing moudles are interconnected to create an array capable of concentrating the number of tip ring pairs from up to 100 subscriber lines to a single pair. This pair is then connected to a separate line scan unit. The line scan unit provides for the control of the multiplexing of the signals of the respective modules to a desired telephone line to equipment such as that of the aforementioned water company. The circuitry of the line scan unit may be secured to the main distribution frame at a convenient location and connected to the individual multiplexing modules by means of electrical cabling. The size of the signal cabling between the multiplexing circuits on the access blocks and the line scanner has been reduced up to 100 times.

Thereby, the access blocks with their multiplexing circuits, as well as the line scan unit, may be readily affixed to and disconnected from a main distribution frame. Such connection and disconnection may be made without interference with the physical arrangement of the harnesses of the telephone lines.

A further advantage, which is a most important consideration in the adaptation of any telephone system, is the fact that the temporary removal of the lightning protector modules, the interposing of the access blocks, and the reconnection of the lightning protector modules, can be done in a relatively short interval of time (on the order of a minute or less). This aspect of the invention avoids any significant interruption in telephone service. Further, the one time interruption to service may be a scheduled interruption.

BRIEF DESCRIPTION OF THE DRAWINGS

The aforementioned aspects and other features of the invention are explained in the following description, taken in connection with the accompanying drawing wherein.

DETAILED DESCRIPTION

Figure 1:
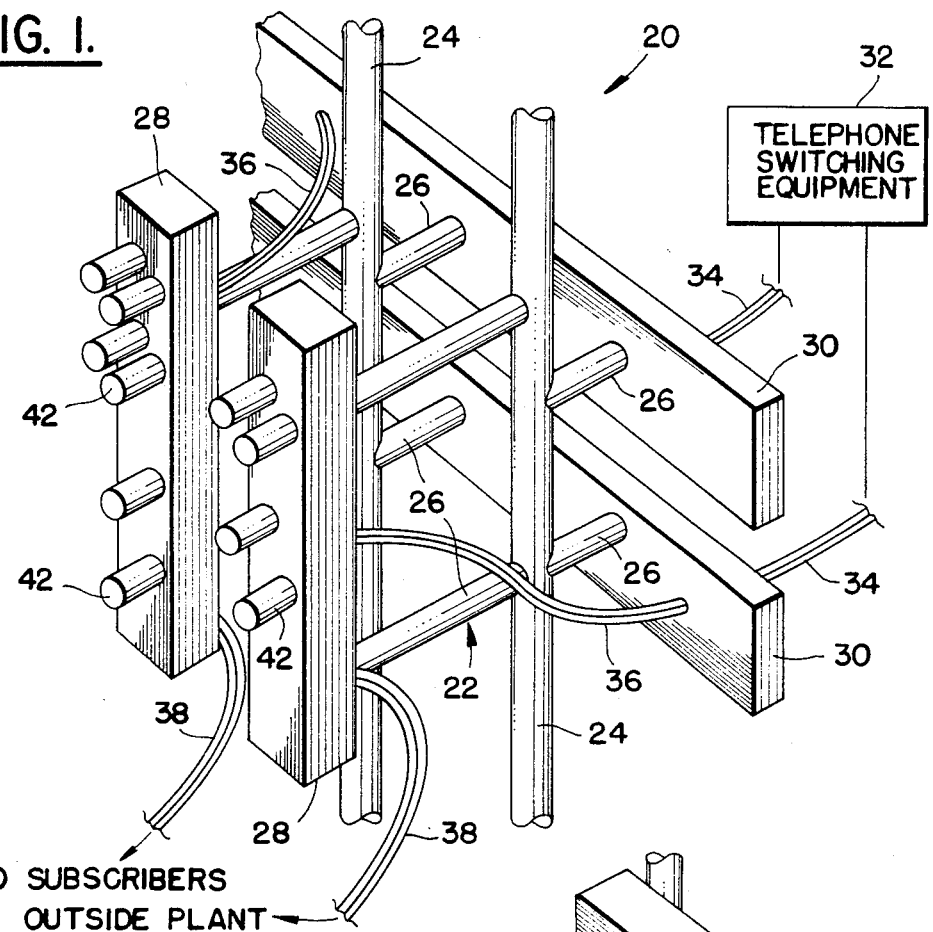
FIG. 1 shows a stylized view of a main distribution frame prior to installation of the access block and multiplexing equipment of the invention.
Figure 2:
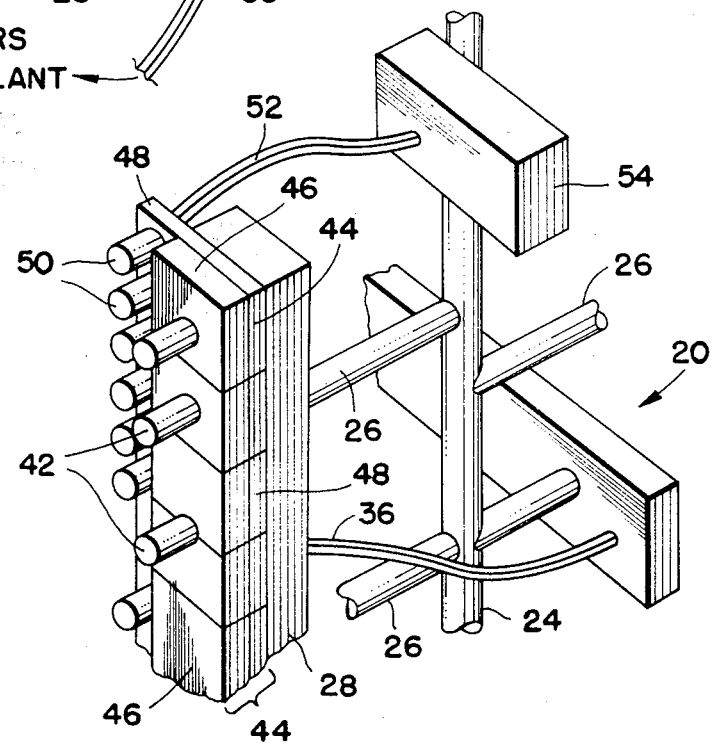
FIG. 2 shows the location of an access block and multiplexing equipment of the invention upon the main distribution frame of FIG. 1.

With reference to FIGS. 1 and 2, there is shown a main distribution frame 20 constructed in the form generally utilized in telephone central switching offices. The pictorial representations presented in FIGS. 1 and 2 have been stylized so as to show only those features of a main distribution frame which are essential to an understanding of the invention.

The frame 20 comprises an armature 22 which is formed of upright legs 24 and horizontal struts extending from the legs 24. A set of input vertical terminal blocks 28 and a set of output horizontal terminal blocks 30 are supported at the outer ends of the struts 26.

The horizontal blocks 30 are used for connecting telephone lines to telephone switching equipment 32, indicated diagrammatically, via harnesses 34. Connection of telephone lines between the vertical blocks 28 and the horizontal blocks 30 is accomplished by harnesses 36 called cross connections. Connection of telephone lines between the remote locations of subscribers outside the plant and the vertical block 28 is accomplished by harnesses 38.

While only a few harnesses are shown in FIG. 1 to demonstrate the connection among the various elements of the frame 20, it is to be understood that numerous harnesses are present, and that such harnesses fill a major portion of the volume of space between the vertical blocks 28 and the horizontal blocks 30. Also, it should be noted that in a typical installation within a telephone central office, there are many tiers of the vertical blocks 28, one above the other, and many tiers of the horizontal blocks 30, one above the other.

In accordance with the usual practice in the construction of main distribution frames, a set of lightning or surge protector modules 42 is inserted in connections formed in each vertical block 28 so as to provide electrical connection between the wires of the harnesses 38 and the harnesses 36. The modules 42 comprise an arc protection circuit, which is suitable for protection of the wiring in the central office from electrical discharges, such as lightning or power surges, which may strike telephone lines coupled between the remote subscriber locations and the central office. The vertical blocks 28 serve as a connecting element whereby the individual subscriber telephone lines can be connected via well-known feed-through terminals (not shown in FIGS. 1 and 2) to terminals (not shown in FIGS. 1 and 2) of the protector modules 42.

In accordance with the invention, an access block 44 is positioned between each protector module 42 and its corresponding vertical block 28. This may be seen by a comparison of FIGS. 1 and 2. FIG. 1 shows the arrangement prior to insertion of the access blocks 44 while FIG. 2 shows the arrangement upon insertion of an access block 44 between protector module 42 and a vertical block 28.

In particular, it is noted that the access block 44 is made sufficiently thin, in accordance with a feature of the invention, so as to fit between protector module 42 and a vertical block 28 without requiring any significant space in an already crowded central telephone office. In accordance with a further feature of the invention, the access blocks can be inserted without the disruption of the wiring in the harnesses 38 and 36. This management, thereby insures integrity of the telephone system during installation of the access blocks 44.

While an access block may be formed with the same dimensions of width and length as a vertical connector block, it has been found to be most beneficial to construct the access blocks of a much smaller size. Such smaller size blocks can then be inserted as a set of the access blocks 44, as depicted in FIG. 2, side by side along the interface between protector modules 42 and its corresponding vertical blocks 28. The advantage of this arrangement may be appreciated from a realization that the terminals of the protector modules 42 and of the vertical block 28 may become oxidized, or otherwise roughened so as to require more physical strength, on the part of installation personnel, than would be desirable in the connection of an access block to the vertical block.

Accordingly, the access blocks have been formed as a set of blocks 44 which are substantially smaller than the vertical block. For example, in the case of a vertical block 28 having five protector modules 42 per row, and twenty rows, ten access blocks 44 would be provided for each vertical block 28. Each access block 44 would contain terminals to mate with ten sets of terminals corresponding to the ten protector modules 42 in two rows in the array of modules 42 carried by a block 28.

Thereby, each access block 44 need mate with only one-tenth of the terminals on a complete vertical block 28 so as to greatly facilitate the interconnection of an access block 44 with a vertical block 28. During the installation of the access blocks 44, the blocks would be installed one at a time in side-by-side arrangement along a vertical block 28. The access blocks can be loaded with protector modules 42 prior to inserting of the access block into the vertical block 28. Thus, installation of an access block would require the following steps: (1) insert ten protection modules into an access block; (2) remove ten protection modules from the vertical block; and (3) insert the access block into the vertical block. With this procedure the time that a line would be interrupted would be a matter of seconds.

With reference also to FIGS. 2–5, each access block 44 comprises a base 46, a board 48 having a printed circuit thereon, and two multiplexers 50 constructed in the form of IC modules. All of the multiplexers 50 on the set of ten access blocks 44 supported by a single vertical block 28 are coupled via a harness 52 to a line scan unit 54 which is mounted on a leg 24 of the frame 20.

In each access block 44, the base 46 may be secured to the board 48 by an adhesive, or other well known mounting means such as screws (not shown) to provide rigidity to the block 44. The board 48 extends beyond the end of the base 46 to provide space for housing the multiplexers 50. One multiplexer 50 is provided for each row of the protector modules 42 and, accordingly, services five sets of telephone lines corresponging to the row of five protector modules 42. Thus, the two multiplexers 50 in each access block 44 service a total of ten subscriber telephone lines.

Each access block 44 further comprises an array of feed-through terminals 56 set within the base 46, and a printed circuit 58 disposed on the board 48. Individual conductors 60 of the printed circuit 58 connect the multiplexers 50 with specific ones of the terminals 56 as will be described more fully with reference to FIGS. 3 and 6.

Each terminal 56 passes through an aperture 62 in the board 48, each aperture 62 having a metallic, cylindrical insert 64 which makes a press fit or solder connection with a terminal 56 so as to insure electrical connection therewith. Each of the conductors 60 terminates at an insert 64 to provide the foregoing electrical connection between a terminal 56 and a multiplexer 50.

Figure 6:
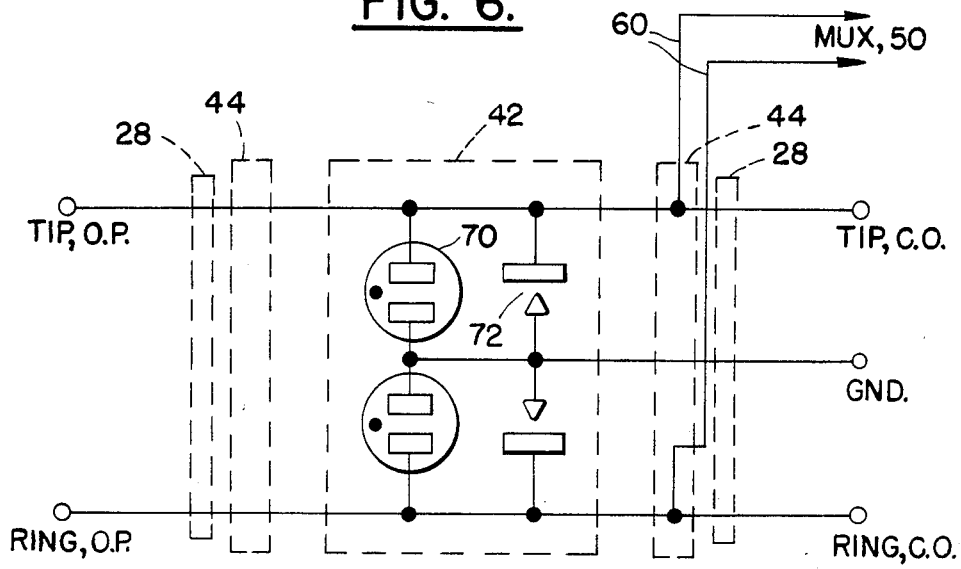
FIG. 6 is a schematic diagram of a lightning or surge protector for use in a protector circuit module of FIG. 1.

In FIG. 6, a module 42 is shown to have a protector circuit comprising a pair of gas-discharge devices 70 and a pair of fusible-pellet devices 72 which connect the tip and ring wires to ground. In the event that an excessively large voltage surge appears on the tip and/or ring wires, as would happen upon the occurrence of a lightning bolt, the devices 70 and 72 conduct the resulting current to ground so as to protect the equipment on the central office (C.O.) side of the module 42.

As shown in FIG. 6, the tip and ring wires pass from a location which is outside the plant (O.P.) through the blocks 28 and 44, respectively, to reach the protector module 42. Thereafter, the tip and ring wires continue to pass by the blocks 44 and 28, respectively, to reach the telephone switching circuitry of the central office. Connection of the conductors 60 of a multiplexer 50 to the tip and ring wires is made in the access block 44 between the module 42 and the central office circuitry. FIG. 6 shows a total of five terminals for the protector module 42, these corresponding to the incoming and outgoing tip and ring wires, and the ground wire. The corresponding five terminals in each set of terminals is also portrayed in FIG. 3.

Figure 3:
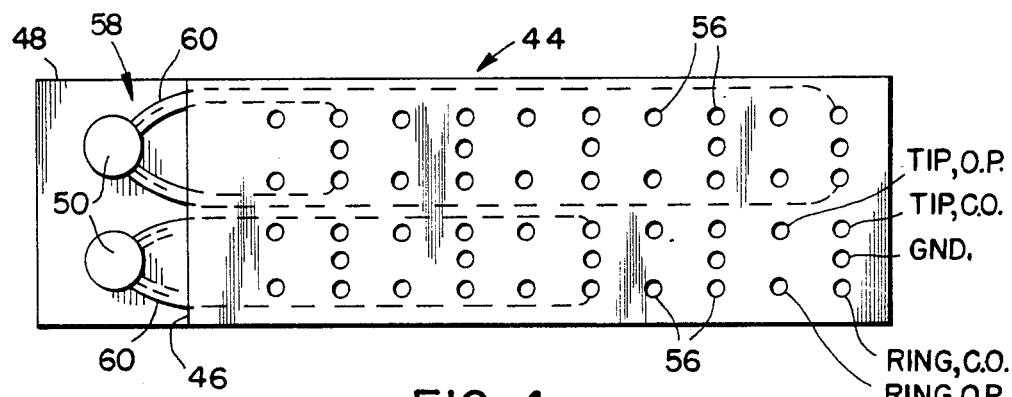
FIG. 3 is a plan view of the access block of FIG. 2.
Figure 4:
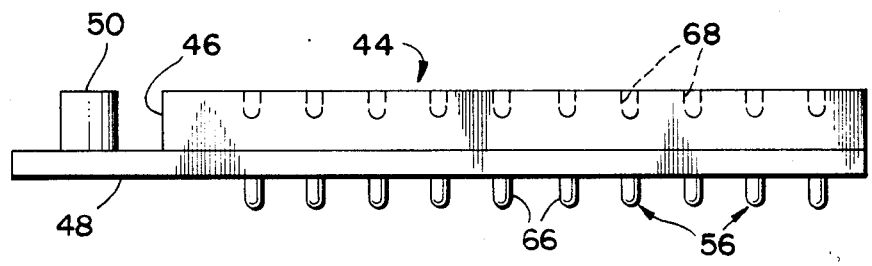
FIG. 4 is a side elevational view of the access block of FIG. 2.
Figure 5:
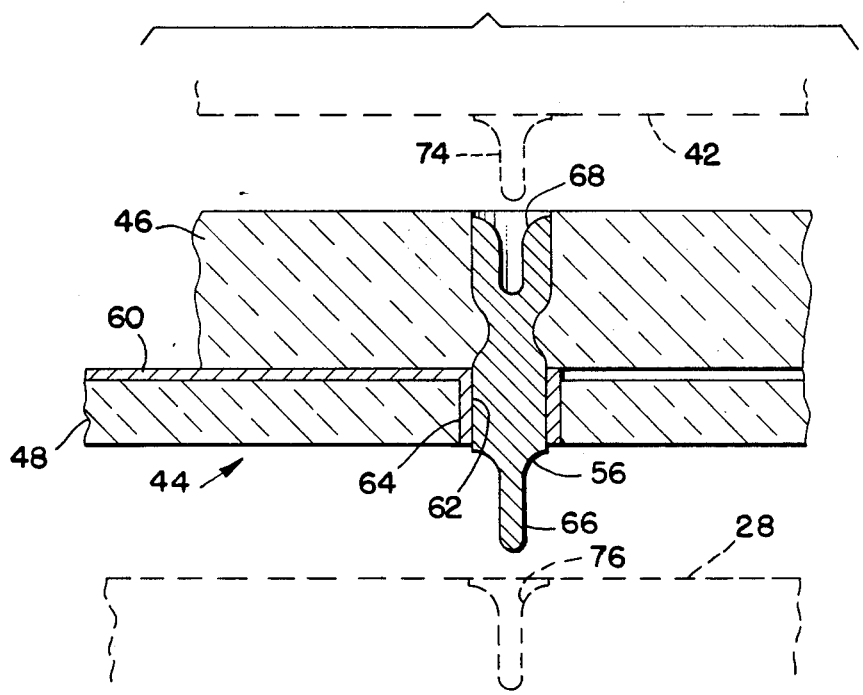
FIG. 5 is an enlarged sectional view of the access block of FIG. 2 showing a terminal passing through the block.

The layout of the feed-through terminals 56 in the access block 44 of FIG. 3 corresponding to the arrangement of the pins (not shown) of a protector module 42. The connection of the conductors 60 to the tip and ring wires for the central-office side of each of the modules 42 is also disclosed in FIG. 3 wherein a few exemplary ones of the conductors 60 are shown passing between the top surface of the board 48 and the bottom surface of the base 46.

Each feed-through terminal 56 is provided with a pin 66 at one end thereof and a socket 68 at the opposite end. The socket 68 receives a pin 74, shown in phantom in FIG. 5, of the protector module 42. The pin 66 mates with a socket 76 of the vertical block 28. Thereby, the configurations of the individual ones of the terminals 56 and their arrangement conforms to that of the sockets 76 of the vertical blocks 28 so as to permit the physical and electrical connection between the block 44 and the block 28.

Figure 7:
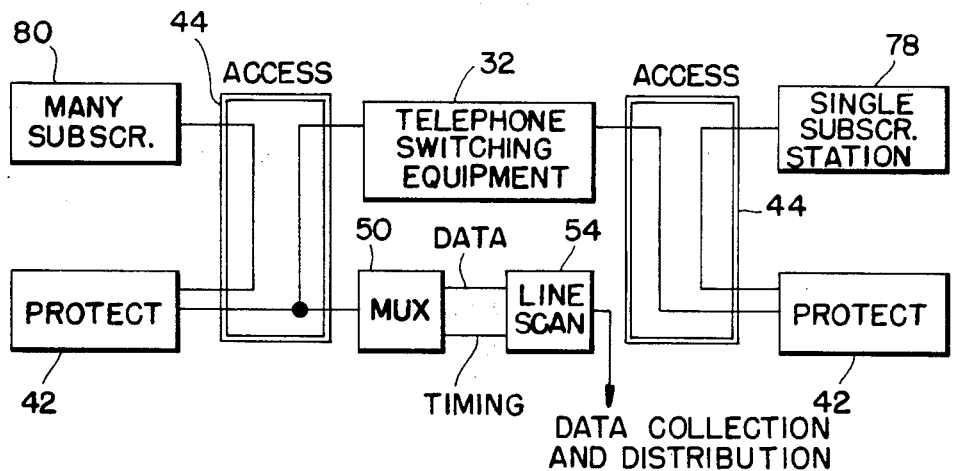
FIG. 7 is an electrical block diagram of the access block in circuit with a multiplexing system.

FIG. 7 shows the electrical interconnection between the many telephone subscribers who are to be serviced by the invention, and a data collection and distribution port which receives data from the many data transmitting subscribers 80.

Two forms of communication exist between the subscribers 80 and destination terminating equipment. First, there is the usual telephone connection via the telephone switching equipment 32. This mode of communication is available when one of the subscribers 80 telephones the station 78. For such communication, the telephone line passes from the subscriber 80 via the access block 44 and a protector module 42 to the telephone switching equipment 32 and, thereafter, via an access block 44 and a protector module 42 to the station 78.

The second mode of communication, made possible by the invention, comprises a multiplexer 50 and the line scan unit 54. If desired, the multiplexing unit 50 may comprise well known switching circuitry by which each of the five subscriber lines coupled thereto may be connected to the scan unit 54 for communication of data thereto.

The scan unit 54, if desired, may also comprise well known switching circuitry by which the output data of each of the multiplexers 50 of an access block 44 may be scanned so as to successively output the data of the various subscriber lines associated with each of the multiplexers 50. The data outputted by the scan unit 54 is then routed to the data collection and distribution port for collection and routing to switching equipment for data distribution. The scan unit 54 may comprise timing circuitry for sequencing the switching of the successive subscriber lines. Such switching can be accomplished manually or automatically if suitable switching circuitry is provided.

Figure 8:
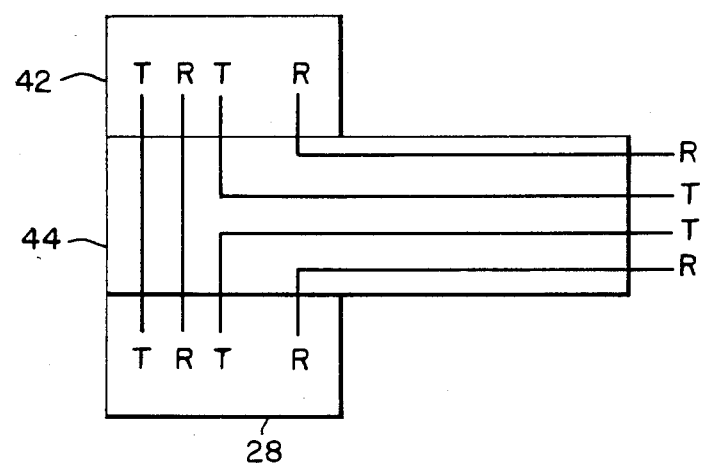
FIG. 8 is a schematic diagram of another embodiment of an access block.

The above describes an access block that provides a Tee connection to the tip and ring pair. It may be desirable to provide an intercept connection as shown in FIG. 8 wherein each of the tip (T) and ring (R) wires are brought out of the access block so that a device could be inserted in series if desired.

Thereby, the foregoing access blocks 44 have made it possible to intercept communications along telephone lines without any physical intrusion into the harnesses of the main distribution frame. In addition, the removal of the protector modules 42, followed by the insertion of a preloaded access block 44 can all be done within a sufficiently small interval of time to insure no more than a negligibly small interruption of telephone service.

It is to be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

We claim:

1. A device for accessing individual subscriber telephone lines at a main distribution frame that includes an input block having a field of terminals, wherein individual sets of terminals connect with respective ones of the subscriber lines, said sets of terminals also being connected to sets of sockets there being a set of sockets for each subscriber line, said frame further including a plurality of protector modules each having a set of pins which mate with a set of sockets of the input block to provide plug-in connection therebetween, there being a surge protector device supported in each said protector module and connected with respective ones of said terminal sets upon connection of said protector modules with said input block, said access device comprising:

an access block being connected between said protector modules and said input block, said access block having sets of pins for plug-in connection to the sets of sockets of the input block and sets of sockets for receiving the pins of the protector modules, corresponding ones of said pins and sockets of the access block being connected;

terminal means formed on a surface of said access block; and connector means for connecting respective ones of said pins and sockets with terminal means, whereby the subscriber lines may be accessed by way of the terminal means.

2. A device as described in claim 1 wherein the connector means forms a Tee connection within the access block.

3. A device as described in claim 1 wherein the connector means forms an intercept connection within the access block.

4. A device is described in claim 1, wherein the connector means additionally comprises a multiplexing means for connecting selected ones of said pins and sockets to said terminal means.

5. A device for accessing individual subscriber telephone lines at a main distribution frame to enable multiplexed communication between subscriber lines and a data collection and distribution station, the frame including an input block having a field of terminals wherein individual sets of terminals connect with respective ones of the subscriber lines, said frame further including a plurality of protector modules each having a set of terminals which mate with one set of terminals of the input block, there being a surge protector device supported in each said protector modules and being connected with corresponding ones of said terminal sets upon a coupling of said protector modules with said input block, said access device comprising:

- a group of access blocks arranged along said input block and being fit between said protector modules and said input block, each of said access blocks having first and second sets of terminals for mating respectively with the terminals of said protector modules and the sets of terminals of said input block;
- each of said access blocks further comprising a multiplexing circuit and means for connecting said multiplexing circuit to terminals in each of said sets of terminals of said access block; and
- means for transmitting data from said multiplexing circuit to said data-collection and distribution station.

6. An access device according to claim 5 wherein each of said access blocks comprises a base which rigidly supports the terminals of said access block, said multiplexing circuit supported at one end of said base and said connecting means is constructed in the form of a printed circuit comprising a set of conductors supported on said base.

7. An access device according to claim 6 wherein each of said access blocks further comprises an array of feed-through terminals set into said block, said printed circuit includes a board contiguous said base and extending beyond said base for supporting said multiplexer circuit, and wherein said feed-through terminals extend through apertures disposed in said board.

8. An access device according to claim 7 wherein said printed circuit includes electrically conductive inserts set into said apertures and contacting said feed-through terminals, said conductors of said connecting means making electrical connection with said inserts.

9. An access device according to claim 8 wherein said sets of terminals in said access block are arranged in two rows disposed along said base, said access block comprising two of said multiplexing circuits with one of said multiplexing circuits being connected to terminals of said first row and the second of said multiplexing circuits being connected to terminals of said second row.

10. An access device according to claim 5 wherein said station is also a subscriber, and said data transmitting means comprises a subscriber line coupling said station to said multiplexing circuit.

11. A device for accessing individual subscriber telephone lines at a main distribution frame that includes an input block having a field of terminals, wherein individual sets of terminals connect with respective ones of the subscriber lines, said sets of terminals also being connected to sets of sockets there being a set of sockets for each subscriber line, said frame further including a plurality of protector modules each having a set of pins which mate with a set of sockets of the input block to provide plug-in connection therebetween, there being a surge protector device supported in each said protector module and connected with respective ones of said terminal sets upon connection of said protector modules with said input block, said access device comprising:

- a group of access blocks arranged side-by-side along said input block and being connected between said protector modules and said input block, each of said access blocks having sets of pins for plug-in connection to the sets of sockets of the input block and sets of sockets for receiving the pins of the protector modules, corresponding ones of said pins and sockets of the access blocks being connected;
- terminal means formed on a surface of each said access block; and
- connector means formed on each access block for connecting respective ones of said pins and sockets with the terminal means, whereby subscriber lines may be accessed by way of the terminal means.

12. An access device for accessing individual subscriber telephone lines at a main distribution frame to enable multiplexed communication between subscribers an a station for receiving such communication, the frame including an input block having a field of terminals wherein individual sets of terminals connect with respective ones of the subscriber lines, said frame further including a plurality of protector modules each of which has a set of terminals which mate with the terminals of a set of terminals on said input block, said access device comprising:

- an access block disposed between said protector modules and said input blocks, said access block having feed-through terminals for making electrical connection between terminals of the protector modules and terminals of said input block;
- connecting means disposed within said access block and having conductors connected with said feed-through terminals for connection with subscriber lines; and
- multiplexing means for selectively coupling the conductors of the connecting means to said station.

13. An access device according to claim 12, wherein the connecting means comprising a printed circuit.

14. An access device according to claim 13 wherein, said access block includes a base for securing said feed-through terminals and, said printed circuit includes a board contiguous said base and extending beyond said base for supporting said selective coupling means alongside said base.

15. An access device according to claim 14 wherein said printed circuit board includes apertures having electrically conductive inserts set into respective ones of the apertures, and wherein the feed-through terminals in said access block extend through said apertures in contact with said inserts, the conductors of the printed circuit connecting with said inserts to establish electrical connection with said feed-through terminals.

* * * * *